United States Patent
Stanjek et al.

(10) Patent No.: US 9,334,434 B2
(45) Date of Patent: May 10, 2016

(54) CROSS-LINKABLE COMPOSITIONS BASED ON ORGANYLOXYSILANE-TERMINATED POLYMERS

(71) Applicant: Wacker Chemie AG, Munich (DE)

(72) Inventors: Volker Stanjek, Ampfing (DE); Lars Zander, Altoetting (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/651,617

(22) PCT Filed: Dec. 4, 2013

(86) PCT No.: PCT/EP2013/075558
§ 371 (c)(1),
(2) Date: Jun. 11, 2015

(87) PCT Pub. No.: WO2014/090659
PCT Pub. Date: Jun. 19, 2014

(65) Prior Publication Data
US 2015/0307757 A1    Oct. 29, 2015

(30) Foreign Application Priority Data

Dec. 13, 2012  (DE) .................. 10 2012 223 139

(51) Int. Cl.
| | | |
|---|---|---|
| *C09J 183/00* | (2006.01) | |
| *C08G 65/336* | (2006.01) | |
| *C08G 77/60* | (2006.01) | |
| *C08K 5/544* | (2006.01) | |
| *C08K 5/5415* | (2006.01) | |
| *C08K 5/54* | (2006.01) | |
| *C08G 77/14* | (2006.01) | |
| *C08G 77/26* | (2006.01) | |
| *C08L 71/02* | (2006.01) | |
| *C08L 101/10* | (2006.01) | |
| *C09J 5/00* | (2006.01) | |
| *C09J 7/02* | (2006.01) | |
| *C09J 183/06* | (2006.01) | |
| *C09J 175/04* | (2006.01) | |
| *C09J 167/00* | (2006.01) | |

(52) U.S. Cl.
CPC ............. *C09J 183/00* (2013.01); *C08G 65/336* (2013.01); *C08G 77/14* (2013.01); *C08G 77/26* (2013.01); *C08G 77/60* (2013.01); *C08K 5/54* (2013.01); *C08K 5/544* (2013.01); *C08K 5/5415* (2013.01); *C08L 71/02* (2013.01); *C08L 101/10* (2013.01); *C09J 5/00* (2013.01); *C09J 7/02* (2013.01); *C09J 183/06* (2013.01); *C09J 167/00* (2013.01); *C09J 175/04* (2013.01)

(58) Field of Classification Search
None
See application file for complete search history.

(56) References Cited

U.S. PATENT DOCUMENTS

| | | | | |
|---|---|---|---|---|
| 5,703,178 A * | 12/1997 | Gasmena | ............... | C08G 59/68 523/179 |
| 6,884,852 B1 | 4/2005 | Klauck et al. | | |
| 7,319,128 B2 | 1/2008 | Ziche et al. | | |
| 8,076,439 B2 * | 12/2011 | Matsushita | .......... | C08G 65/336 156/60 |
| 8,101,704 B2 | 1/2012 | Baumann et al. | | |
| 2007/0066768 A1* | 3/2007 | Gauthier | ................ | C08G 18/10 525/477 |
| 2007/0167598 A1 | 7/2007 | Stanjek et al. | | |
| 2009/0131591 A1 | 5/2009 | Schindler et al. | | |
| 2013/0023617 A1* | 1/2013 | Okamoto | ............. | C08K 5/5415 524/425 |
| 2015/0007938 A1* | 1/2015 | Stanjek | .................. | C09J 101/10 156/307.3 |

FOREIGN PATENT DOCUMENTS

| | | |
|---|---|---|
| EP | 1 093 482 B1 | 4/2001 |
| EP | 1 179 571 B1 | 2/2002 |
| EP | 1 535 940 B1 | 6/2005 |
| EP | 1 641 854 B1 | 4/2006 |
| EP | 1 832 626 B1 | 9/2007 |
| EP | 1 896 523 B1 | 3/2008 |
| EP | 1 939 256 B1 | 7/2008 |
| WO | 2007/131986 A2 | 11/2007 |
| WO | WO 2013/117471 * | 8/2013 |

* cited by examiner

*Primary Examiner* — Marc Zimmer
(74) *Attorney, Agent, or Firm* — Brooks Kushman P.C.

(57) ABSTRACT

A crosslinkable composition comprising aminoalkyl-functional and epoxy-functional silanes and/or siloxanes provides an improvement in adhesion and sealing of various substrates under the conditions of cold-water storage, especially when a significant portion of all the silicon units has an amino-functional or an epoxy-functional unit and has an SiC-bonded, optionally halogen-substituted alkyl radical.

13 Claims, No Drawings

CROSS-LINKABLE COMPOSITIONS BASED ON ORGANYLOXYSILANE-TERMINATED POLYMERS

CROSS REFERENCE TO RELATED APPLICATIONS

This application is the U.S. National Phase of PCT Appln. No. PCT/EP2013/075558 filed Dec. 4, 2013, which claims priority to German Application No. 10 2012 223 139.0 filed Dec. 13, 2012, the disclosures of which are incorporated in their entirety by reference herein.

BACKGROUND OF THE INVENTION

1. Field of the Invention

The invention relates to crosslinkable compositions of silane-crosslinking prepolymers, to processes for producing them, and to their use as adhesives and sealants, more particularly for the adhesive bonding of substrates.

2. Description of the Related Art

Polymer systems which possess reactive alkoxysilyl groups have a long history. On contact with water or atmospheric moisture, these alkoxysilane-terminated polymers are capable of undergoing condensation with one another even at room temperature, accompanied by elimination of the alkoxy groups. One of the most important applications of such materials is the production of adhesives, more particularly of elastic adhesive systems.

Adhesives based on alkoxysilane-crosslinking polymers, exhibit very good mechanical properties in the fully cured state, being capable not only of being highly elastic but also of possessing tensile strength. Another critical advantage of silane-crosslinking systems relative to numerous other adhesive and sealant technologies (to isocyanate-crosslinking systems, for example) is the toxicological unobjectionability of the prepolymers. Numerous applications prefer one-component systems (1K systems) which cure on contact with atmospheric moisture. A disadvantage of many systems conforming to the prior art is the low reactivity, which necessitates an aggressive catalysis. The mixtures in question therefore typically include considerable quantities of toxicologically objectionable tin catalysts.

An advantage here is the use of what are called α-silane-terminated prepolymers, which possess reactive alkoxysilyl groups connected through a methylene spacer to an adjacent urethane unit. This class of compound is highly reactive and requires neither tin catalysts nor strong acids or bases in order to achieve high cure rates on air contact. Commercially available α-silane-terminated prepolymers are GENIOSIL® STP-E10 or -E30 from Wacker-Chemie AG.

A disadvantage possessed by all silane-crosslinking adhesives, however, is that such adhesives fail to exhibit adequate adhesion to every material. This effects especially adhesion under humid conditions, more particularly the adhesion after cold-water storage. Adhesion problems often occur even with substrates such as coated steels, stainless steels, or anodized metals, or even glass, to which good or at least satisfactory adhesion can usually be achieved under dry conditions.

These problems occur to an increased degree with adhesives which exhibit a tensile strength of at least 1 MPa as measured by DIN EN 14293 and/or DIN EN 53504 after their curing. For adhesive seams with corresponding mechanical demands; therefore, these high-tensile adhesives impose exacting requirements in terms of adhesion, since on encountering high tensile forces they are required neither to rupture nor, of course, to undergo detachment from the substrate.

The adhesion profile of high-tensile adhesives can indeed be improved by addition of organofunctional silanes, in which case the combination of aminoalkyl-functional with glycidyloxyalkyl-functional alkoxysilanes is one of the combinations of adhesion promoters described as being especially advantageous for example in EP 1 179 571, EP 1 832 626, or EP 1 939 256, and their US equivalents U.S. Pat. No. 6,569,980 (B1), U.S. Pat. No. 7,781,525 (B2), or U.S. Pat. No. 8,076,439 (B2) respectively, the disclosures of which are incorporated in their entirety by reference herein. As described in WO 2007/131986, and its US equivalent US 2009/131591, the disclosures of which are incorporated in their entirety by reference herein, such combinations of silanes can be used to exert positive influence on other properties too such as the resilience, for example. The adhesion after cold-water storage, in contrast, cannot be sufficiently improved in this way.

SUMMARY OF THE INVENTION

It has now been unexpectedly and surprisingly discovered that the combination of aminoalkyl-functional and epoxy-functional silanes and/or siloxanes leads to an improvement in adhesion under the conditions of cold-water storage, especially when a significant portion of all the silicon units present in the combination has an amino-functional or an epoxy-functional unit and has an SiC-bonded, optionally halogen-substituted alkyl radical.

DESCRIPTION OF THE PREFERRED EMBODIMENTS

The invention provides crosslinkable compositions (K) comprising (A) 100 parts by weight of compounds of the formula $$Y\text{---}[(CR^1{}_2)_b\text{---}SiR_a(OR^2)_{3-a}]_x \qquad (I)$$

where

Y is an x-valent polymer radical bonded via nitrogen, oxygen, sulfur, or carbon, R may be identical or different and is a monovalent, optionally substituted, SiC-bonded hydrocarbon radical, $R^1$ may be identical or different and is hydrogen or a monovalent, optionally substituted hydrocarbon radical which may be bonded to the carbon atom via nitrogen, phosphorus, oxygen, sulfur, or carbonyl group, $R^2$ may be identical or different and is hydrogen or a monovalent, optionally substituted hydrocarbon radical, x is an integer from 1 to 10, preferably 1, 2, or 3, more preferably 1 or 2, a may be identical or different and is 0, 1, or 2, preferably 0 or 1, and b may be identical or different and is an integer from 1 to 10, preferably 1, 3, or 4, more preferably 1 or 3, most preferably 1, (B) 0.1 to 30 parts by weight of organosilicon compounds comprising units of the formula $$DSi(OR^3)_d R^4{}_e O_{(3-d-e)/2} \qquad (II),$$

in which

D is a monovalent, SiC-bonded radical with basic nitrogen, $R^3$ may be identical or different and is hydrogen or optionally substituted hydrocarbon radicals, $R^4$ may be identical or different and is an unsubstituted or halogen-substituted, SiC-bonded alkyl radical having 1 to 8 carbon atoms, d is 0, 1, 2, or 3, preferably 1, 2, or 3, more preferably 2 or 3, and e is 0, 1, 2, or 3, preferably 1 or 0,
the sum total of d+e being less than or equal to 3 and at least one radical (OR$^3$) being present per molecule, (C) 0.1 to 30 parts by weight of organosilicon compounds comprising units of the formula

$$ESi(OR^5)_g R^6_h O_{(3-g-h)/2} \quad (III),$$

in which

E may be identical or different and is a monovalent, SiC-bonded radical having an epoxy function, R$^5$ may be identical or different and is hydrogen or optionally substituted hydrocarbon radicals, R$^6$ may be identical or different and is an unsubstituted or halogen-substituted, SiC-bonded alkyl radical having 1 to 8 carbon atoms, g is 0, 1, 2, or 3, preferably 1, 2, or 3, more preferably 2 or 3, and h is 0, 1, 2, or 3, preferably 1 or 0, the sum total of g+h being less than or equal to 3 and at least one radical (OR$^5$) being present per molecule, with the proviso that at least 15%, preferably at least 25%, more preferably at least 35%, most preferably at least 45%, of all of the Si atoms in components (B) and (C) belong to units of the formulae (II) or (III) where e or h is 1, and at least one further component, selected from the components (D) 0.1 to 30 parts by weight of alkoxysilanes which are different from components (B) and (C), and (E) 1 to 500 parts by weight of silicone resins which are different from components (B) and (C), comprising units of the formula

$$R^7_i(R^8O)_j SiO_{(4-i-j)/2} \quad (IV),$$

where

R$^7$ may be identical or different and is hydrogen or a monovalent, SiC-bonded, optionally substituted hydrocarbon radical, R$^8$ may be identical or different and is hydrogen or a monovalent, optionally substituted hydrocarbon radical, i is 0, 1, 2, or 3, and j is 0, 1, 2, or 3, preferably 0, 1, or 2, with the proviso that the sum total of i+j is less than or equal to 3 and in at least 50%, preferably at least 60%, of the units of the formula (IV) i is 0 or 1.

The invention is based in particular on the finding that the combination of aminoalkyl-functional and epoxy-functional silanes and/or siloxanes leads to an improvement in adhesion under the conditions of cold-water storage, especially when a significant portion of all the silicon units present in the combination has an amino-functional or an epoxy-functional unit and has an SiC-bonded, optionally halogen-substituted alkyl radical.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radical; hexyl radicals such as the n-hexyl radical; heptyl radicals such as the n-heptyl radical; octyl radicals such as the n-octyl radical, isooctyl radicals, and the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radical, and methylcyclohexyl radicals; alkenyl radicals such as the vinyl, 1-propenyl, and the 2-propenyl radical; aryl radicals such as the phenyl, naphthyl, anthryl, and phenanthryl radical; alkaryl radicals such as o-, m-, and p-tolyl radicals; xylyl radicals and ethylphenyl radicals; and aralkyl radicals such as the benzyl radical, the α- and the β-phenylethyl radical.

Examples of substituted radicals R are haloalkyl radicals and haloaryl radicals such as the o-, m-, and p-chlorophenyl radical.

Radical R preferably comprises monovalent hydrocarbon radicals which are optionally substituted by halogen atoms and which have 1 to 6 carbon atoms, more preferably alkyl radicals having 1 or 2 carbon atoms, most preferably the methyl radical.

Examples of radicals R$^1$ are hydrogen, the radicals specified for R, and also optionally substituted hydrocarbon radicals bonded to the carbon atom via nitrogen, phosphorus, oxygen, sulfur, carbon, or carbonyl group.

Preferably radical R$^1$ is hydrogen and hydrocarbon radicals having 1 to 20 carbon atoms, more particularly hydrogen atom.

Examples of radical R$^2$ are hydrogen atom or the examples specified for radical R.

Radical R$^2$ is preferably hydrogen atom or alkyl radicals which are optionally substituted by halogen atoms and which have 1 to 10 carbon atoms, more preferably alkyl radicals having 1 to 4 carbon atoms, most preferably the methyl and the ethyl radical.

Polymer radical Y preferably comprises organic polymer radicals which as polymer chain comprise polyoxyalkylenes such as polyoxyethylene, polyoxypropylene, polyoxybutylene, polyoxytetramethylene, polyoxyethylene-polyoxypropylene copolymer, and polyoxypropylene-polyoxybutylene copolymer; hydrocarbon polymers such as polyisobutylene, polyethylene, or polypropylene, and copolymers of polyisobutylene with isoprene; polyisoprenes; polyurethanes; polyesters, polyamides; polyacrylates; polymethacrylates; and polycarbonates, which are bonded preferably via —O—C(=O)—NH—, —NH—C(=O)O—, —NH—C(=O)—NH—, —NR'—C(=O)—NH—, NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, and —NR'— to the group or groups —[(CR$^1_2$)$_b$—SiR$_a$(OR$^2$)$_{3-a}$], where R' may be identical or different and has a definition specified for R, or is a group —CH(COOR'')—CH$_2$—COOR'', in which R'' may be identical or different and has a definition specified for R.

Examples of radicals R' are cyclohexyl, cyclopentyl, n-propyl and isopropyl, n-butyl, isobutyl, and tert-butyl radicals, the various stereoisomers of the pentyl radical, hexyl radical, or heptyl radical, and also the phenyl radical.

Radical R' is preferably a group —CH(COOR'')—CH$_2$—COOR'' or an optionally substituted hydrocarbon radical having 1 to 20 carbon atoms, more preferably a linear, branched or cyclic alkyl group having 1 to 20 carbon atoms, or an aryl group which has 6 to 20 carbon atoms and is optionally substituted by halogen atoms.

The radicals R'' are preferably alkyl groups having 1 to carbon atoms, more preferably methyl, ethyl, or propyl radicals.

More preferably, radical Y in formula (I) comprises polyurethane radicals and polyoxyalkylene radicals, most preferably polyoxypropylene-containing polyurethane radicals or polyoxypropylene radicals.

The compound of the formula (I) here may have the groups —[(CR$^1_2$)$_b$—SiR$_a$(OR$^2$)$_{3-a}$], attached in the manner described, at any desired locations within the polymer, such as within the chain and/or terminally, preferably within the chain and terminally, more preferably terminally.

Where Y stands for polyurethane radicals, the radicals in question are preferably those whose chain ends are bonded via —NH—C(=O)—O—, —NH—C(=O)—NH—, —NR'—C(=O)—NH—, or —NH—C(=O)—NR'—, more particularly via —O—C(=O)—NH— or —NH—C(=O)—NR'—, to the group or groups —[(CR$^1{}_2$)$_b$—SiR$_a$(OR$^2$)$_{3-a}$], with all of the radicals and indices having one of the definitions given above. The polyurethane radicals Y are preparable preferably from linear or branched polyoxyalkylenes, more particularly from polypropylene glycols, and from di- or polyisocyanates. These radicals Y preferably have number-average molar masses $M_n$ of 10,000 to 30,000 g/mol, more preferably of 11,000 to 20,000 g/mol. Suitable processes for preparing corresponding compounds (A), and also examples of the compounds (A) themselves, are described in publications including EP 1 093 482 B1 (paragraphs [0014]-[0023], [0039]-[0055] and also inventive example 1 and comparative example 1) and its US equivalent U.S. Pat. No. 6,884,852 (B1), the disclosures of which are incorporated in their entirety by reference herein and EP 1 641 854 B1 (paragraphs [0014]-[0035], inventive examples 4 and 6, and comparative examples 1 and 2), and its US equivalent US 2007/167598, the disclosures of which are incorporated in their entirety by reference herein.

Where Y stands for polyoxyalkylene radicals, the radicals in question are preferably linear or branched polyoxyalkylene radicals, more preferably polyoxypropylene radicals, whose chain ends are bonded preferably via —O—C(=O)—NH— to the group or groups —[(CR$^1{}_2$)$_b$—SiR$_a$(OR$^2$)$_{3-a}$], with all of the radicals and indices having one of the definitions above. The polyoxyalkylene radicals Y preferably have number-average molar masses $M_n$ of 10,000 to 30,000 g/mol, more preferably of 11,000 to 20,000 g/mol. Suitable processes for preparing the corresponding compounds (A) and also examples of the compounds (A) themselves are described in publications including EP 1 535 940 B1 (paragraphs [0005]-[0025] and also inventive examples 1-3 and comparative examples 1-4), and its US equivalent U.S. Pat. No. 7,319,128 (B1), the disclosures of which are incorporated in their entirety by reference herein and EP 1 896 523 B1 (paragraphs [0008]-[0047]) and its US equivalent U.S. Pat. No. 8,101,704 (B1), the disclosures of which are incorporated in their entirety by reference herein.

The number-average molar mass $M_n$ can be determined by means of Size Exclusion Chromatography (SEC) against polystyrene standard, in THF, at 60° C., at a 1.2 ml/min flow rate, and with detection by RI (refractive index detector) on a Styragel HR3-HR4-HR5-HR5 column set from Waters Corp. USA, with an injection volume of 100 μl.

The end groups of the compounds of the formula (I) preferably groups of the general formulae

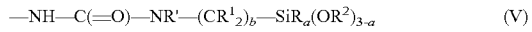

$$\text{—NH—C(=O)—NR'—(CR}^1{}_2)_b\text{—SiR}_a(\text{OR}^2)_{3-a} \quad (V)$$

or

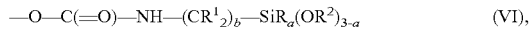

$$\text{—O—C(=O)—NH—(CR}^1{}_2)_b\text{—SiR}_a(\text{OR}^2)_{3-a} \quad (VI),$$

where the radicals and indices have one of the definitions specified above for them.

The end groups of the inventively employed compounds of the formula (I) are more preferably groups of the formula (VI).

Component (A) preferably comprises silane-terminated polyoxyalkylenes, more preferably silane-terminated polyoxypropylenes, having end groups of the formula (VI), where R$^1$ is hydrogen atom, R is methyl radical, R$^2$ is methyl or ethyl radical, b is 1 or 3, and a is 0 or 1. Apart from the end groups (VI), these silane-terminated polyoxyalkylenes preferably have exclusively polyether units. The polymers (A) of the invention preferably possess 2 or 3, more preferably 2, end groups of the formula (VI) per molecule.

A great advantage of silane-terminated polyoxyalkylenes having end groups of the formula (VI) relative to silane-terminated polyoxyalkylenes with other end groups is their ease of preparability by reaction of common polyoxyalkylenes, terminated with hydroxyl groups, and silanes of the formula

$$\text{OCN—(CR}^1{}_2)_b\text{—SiR}_a(\text{OR}^2)_{3-a} \quad (VII)$$

in which all the radicals and indices have one of the definitions stated above. It is important that this reaction achieves largely complete termination of the chain ends present, thereby distinguishing the products resulting from this method significantly from the products of other methods such as a hydrosilylation of α,ω-unsaturated polymers with SiH-functional silanes, for example.

This largely complete termination results surprisingly in much better properties, especially in much better tensile strengths of the cured compositions (K) comprising the polymers (A), in comparison to polymers whose end groups have been produced by another route such as via hydrosilylation, for example.

The silane-terminated polymers (A) are preferably polymers whose chain ends are terminated to an extent of at least 85%, more preferably at least 90%, most preferably at least 95%, with end groups of the formula (VI). Especially preferred as compounds (A) are linear polyoxypropylenes whose chains are terminated to an extent of at least 85%, more preferably at least 90%, most preferably at least 95%, with end groups of the formula (VI).

The number-average molecular weights $M_n$ of the compounds of the formula (I) are preferably at least 10,000 g/mol, more preferably at least 11,000 g/mol, and preferably not more than 30,000 g/mol, more preferably not more than 24,000 g/mol, more particularly not more than 22,000 g/mol.

The viscosity of the compounds (A) is preferably at least 0.2 Pas, more preferably at least 1 Pas, most preferably at least 5 Pas, and preferably not more than 700 Pas, more preferably not more than 100 Pas, in each case measured at 20° C.

The inventively employed component (A) may comprise only one kind of compound of the formula (I) or else mixtures of different kinds of compounds of the formula (I). Component (A) may contain exclusively compounds of the formula (I) in which more than 90%, preferably more than 95%, more preferably more than 98% of all silyl groups bonded to the radical Y are identical. It is also possible to use a component (A) which consists at least partly of compounds of the formula (I) in which different silyl groups are bonded to a radical Y. Lastly, mixtures of different compounds of the formula (I) may be used as component (A) in which in total at least 2 different kinds of silyl groups bonded to radicals Y are present, but where all silyl groups each bonded to one radical Y are identical.

If component (A) comprises different kinds of compounds of the formula (I), preference is given to mixtures which comprise not only compounds (A1) having end groups of the formula (V) or (VI) in which b=1, R$^1$=H, and a=0 or 1, but also compounds (A2) having end groups of the formula (V) or (VI) in which b=3, R$^1$=H, and a=0, and particular preference to those in which the weight ratio of (A1) to (A2) is 0.1 to 10, preferably 0.2 to 5.

In one preferred embodiment, a mixture of different compounds of the formula (I) is used as component (A), comprising at least one compound (A1) having end groups of the formula (VI) in which b=1, $R^1$=H, a=1, and $R^2$=$CH_3$, and at least one compound (A2) having end groups of the formula (VI) in which b=3, $R^1$=H, a=0, and $R^2$=$CH_3$, with a weight ratio of (A1) to (A2) of preferably 0.1 to 10, more preferably of 0.2 to 5.

The compounds of the component (A) are commercial products or can be prepared by methods that are commonplace within chemistry.

Based on 100 parts by weight of component (A), the compositions (K) contain preferably 0.2 to 20 parts by weight, more preferably 0.5 to 15 parts by weight of component (B).

The organosilicon compounds of the component (B) may be silanes, i.e., compounds of the formula (II) with d+e=3, and siloxanes, i.e., compounds comprising units of the formula (II) with d+e≤2.

Organosiloxanes (B) may consist of units of the formula (II) or may comprise further units such as diorganylsiloxy units, for example. If component (B) comprises organosiloxanes, they preferably consist exclusively of units of the formula (II). Component (B) preferably comprises silanes of the formula (II) and/or their partial hydrolyzates.

If component (B) comprises partial hydrolyzates of the silanes of the formula (II), preference is given to those having an average molecular weight $M_n$ of <2000 g/mol and particularly of <1000 g/mol.

Examples of optionally substituted hydrocarbon radicals $R^3$ and $R^4$ are the examples specified for radical R. The radicals $R^3$ preferably comprise hydrogen atoms and hydrocarbon radicals which have 1 to 18 carbon atoms and which are optionally substituted by halogen atoms, and more preferably comprise hydrogen atom and hydrocarbon radicals which have 1 to 10 carbon atoms, and most preferably comprise the methyl and the ethyl radical. Radical $R^4$ comprises preferably hydrocarbon radicals having 1 to 5 carbon atoms, most preferably the methyl radical.

Examples of radicals D are radicals of the formulae $H_2N(CH_2)_3$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $C_3H_7NH(CH_2)_3$—, $C_4H_9NH(CH_2)_3$—, $C_5H_{11}NH(CH_2)_3$—, $C_6H_{13}NH(CH_2)_3$—, $C_7H_{15}NH(CH_2)_3$—, $H_2N(CH_2)_4$—, $H_2N$—$CH_2$—$CH(CH3)$-$CH_2$—, $H_2N(CH_2)_5$—, cyclo-$C_5H_9NH(CH_2)_3$—, cyclo-$C_6H_{11}NH(CH_2)_3$—, phenyl-NH$(CH_2)_3$—, $(CH_3)_2N(CH_2)_3$—, $(C_2H_5)_2N(CH_2)_3$—, $H_2N(CH_2)$—, $H_2N(CH_2)_2NH(CH_2)$—, $H_2N(CH_2)_2NH(CH_2)_2NH(CH_2)$—, $H_3CNH(CH_2)$—, $C_2H_5NH(CH_2)$—, $C_3H_7NH(CH_2)$—, $C_4H_9NH(CH_2)$—, $C_5H_{11}NH(CH_2)$—, $C_6H_{13}NH(CH_2)$—, $C_7H_{15}NH(CH_2)$—, cyclo-$C_5H_9NH(CH_2)$—, cyclo-$C_6H_{11}NH(CH_2)$—, phenyl-NH$(CH_2)$—, $(CH_3)_2N(CH_2)$—, $(C_2H_5)_2N(CH_2)$—, $(CH_3O)_3Si(CH_2)_3NH(CH_2)_3$—, $(C_2H_5O)_3Si(CH_2)_3NH(CH_2)_3$—, $(CH_3O)_2(CH_3)Si(CH_2)_3NH(CH_2)_3$—, and $(C_2H_5O)_2(CH_3)Si(CH_2)_3NH(CH_2)_3$—. Radical D is preferably the $H_2N(CH_2)_3$— or the $H_2N(CH_2)_2NH(CH_2)_3$— radical. Examples of the inventively employed compounds comprising units of the formula (II) are $H_2N(CH_2)_3$—$Si(OCH_3)_3$, $H_2N(CH_2)_3$—$Si(OC_2H_5)_3$, $H_2N(CH_2)_3$—$Si(OCH_3)_2CH_3$, $H_2N(CH_2)_3$—$Si(OC_2H_5)_2CH_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$, $H_2N(CH_2)_2N(CH_2)_3$—$Si(OH)_3$, $H_2N(CH_2)_2NH(CH_2)_3$—$Si(OH)_2CH_3$, $H_2N(CH_2)_2NH(CH_2)_2NH(CH_2)_3$—$Si(OCH_3)_3$, $H_2N(CH_2)_2NH(CH_2)_2NH(CH_2)_3$—$Si(OC_2H_5)_3$, cyclo-$C_6H_{11}NH(CH_2)_3$—$Si(OCH_3)_3$, cyclo-$C_6H_{11}NH(CH_2)_3$—$Si(OC_2H_5)_3$, cyclo-$C_6H_{11}NH(CH_2)_3$—$Si(OCH_3)_2CH_3$, cyclo-$C_6H_{11}NH(CH_2)_3$—$Si(OC_2H_5)_2CH_3$, cyclo-$C_6H_{11}NH(CH_2)_3$—$Si(OH)_3$, cyclo-$C_6H_{11}NH(CH_2)_3$—$Si(OH)_2CH_3$, phenyl-NH$(CH_2)_3$—$Si(OCH_3)_3$, phenyl-NH$(CH_2)_3$—$Si(OC_2H_5)_3$, phenyl-NH$(CH_2)_3$—$Si(OCH_3)_2CH_3$, phenyl-NH$(CH_2)_3$—$Si(OC_2H_5)_2CH_3$, phenyl-NH$(CH_2)_3$—$Si(OH)_3$, phenyl-NH$(CH_2)_3$—$Si(OH)_2CH_3$, $HN((CH_2)_3$—$Si(OCH_3)_3)_2$, $HN((CH_2)_3$—$Si(OC_2H_5)_3)_2HN((CH_2)_3$—$Si(OCH_3)_2CH_3)_2$, $HN((CH_2)_3$—$Si(OC_2H_5)_2CH_3)_2$, cyclo-$C_6H_{11}NH(CH_2)$—$Si(OCH_3)_3$, cyclo-$C_6H_{11}NH(CH_2)$—$Si(OC_2H_5)_3$, cyclo-$C_6H_{11}NH(CH_2)$—$Si(OCH_3)_2CH_3$, cyclo-$C_6H_{11}NH(CH_2)$—$Si(OC_2H_5)_2CH_3$, cyclo-$C_6H_{11}NH(CH_2)$—$Si(OH)_3$, cyclo-$C_6H_{11}NH(CH_2)$—$Si(OH)_2CH_3$, phenyl-NH$(CH_2)$—$Si(OCH_3)_3$, phenyl-NH$(CH_2)$—$Si(OC_2H_5)_3$, phenyl-NH$(CH_2)$—$Si(OCH_3)_2CH_3$, phenyl-NH$(CH_2)$—$Si(OC_2H_5)_2CH_3$, phenyl-NH$(CH_2)$—$Si(OH)_3$, and phenyl-NH$(CH_2)$—$Si(OH)_2CH_3$ and also their partial hydrolyzates, with preference being given to $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(C_2H_5)_2CH_3$ and also their respective partial hydrolyzates, and particular preference to $H_2N(CH_2)_2NH(CH_2)_3$—$Si(OCH_3)_2CH_3$, $H_2N(CH_2)_2NH(CH_2)_3$—$Si(C_2H_5)_2CH_3$, and also their respective partial hydrolyzates.

The inventively employed organosilicon compounds (B) in the compositions (K) may take on the function of an adhesion promoter and also the function of a curing catalyst or curing co-catalyst.

The inventively employed organosilicon compounds (B) are commercial products and/or may be prepared by methods commonplace within chemistry.

Based on 100 parts by weight of component (A), the compositions (K) comprise preferably 0.2 to 20 parts by weight, more preferably 0.5 to 10 parts by weight, of component (C).

The optionally employed organosilicon compounds of the component (C) may be silanes, i.e., compounds of the formula (III) with g+h=3, and siloxanes, i.e., compounds comprising units of the formula (III) with g+h≤2.

Organosiloxanes (C) may consist of units of the formula (III) or may comprise further units such as diorganylsiloxy units, for example. If component (C) comprises organosiloxanes, they preferably consist exclusively of units of the formula (III). Component (C) preferably comprises silanes of the formula (III) and/or their partial hydrolyzates. If component (C) comprises partial hydrolyzates of the silanes of the formula (III), preference is given to those having an average molecular weight $M_n$ of <2000 g/mol and particularly of <1000 g/mol.

Examples of optionally substituted hydrocarbon radicals $R^5$ and $R^6$ are the examples specified for radical R. The radicals $R^5$ preferably comprise hydrogen and hydrocarbon radicals which have 1 to 18 carbon atoms and which are optionally substituted by halogen atoms, and more preferably comprise hydrogen and hydrocarbon radicals which have 1 to 10 carbon atoms, and most preferably comprise the methyl and the ethyl radical. Radical $R^6$ comprises preferably hydrocarbon radicals having 1 to 5 carbon atoms, most preferably the methyl radical.

The radical E preferably comprises radicals of the formulae

(VIII)

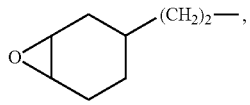

(IX)

more preferably radicals of the formula (VIII).

Examples of the inventively employed compounds comprising units of the formula (III) are 2-(3,4-epoxycyclohexyl) ethyl-trimethoxysilane, 2-(3,4-epoxycyclohexyl)ethyl-triethoxysilane, 2-(3,4-epoxycyclohexyl)ethyl-methyldimethoxysilane, 2-(3,4-epoxycyclohexyl)ethyl-methyldiethoxysilane, glycidyloxypropyl-trimethoxysilane, glycidyloxypropyl-triethoxysilane, glycidyloxypropyl-methyldimethoxysilane or glycidyloxypropyl-methyldiethoxysilane, and also their partial hydrolyzates, with preference being given to glycidyloxypropyl-trimethoxysilane, glycidyloxypropyl-triethoxysilane, glycidyloxypropyl-methyldimethoxysilane, or glycidyloxypropyl-methyldiethoxysilane and also their respective partial hydrolyzates, and particular preference to glycidyloxypropyl-methyldimethoxysilane or glycidyloxypropyl-methyldiethoxysilane and also their respective partial hydrolyzates.

The inventively employed organosilicon compounds (C) are commercial products and/or can be prepared by methods commonplace within chemistry.

The components (B) and (C) are selected with the proviso that at least 15% of all of the Si atoms in components (B) and (C) belong to units of the formulae (II) or (III), where e or h is 1. It is immaterial whether components (B) comprising units of the formula (II) with e=1 or components (C) comprising units of the formula (III) with h=1, or else both, are used, as long as the proviso specified above is met.

Further to components (A), (B), and (C), the compositions (K) also comprise component (D) and/or component (E).

Where the compositions (K) comprise component (D), the amounts involved are preferably 0.2 to 20 parts by weight, more preferably 0.5 to 10 parts by weight, based in each case on 100 parts by weight of component (A).

Examples of optionally employed component (D) are tetraalkoxysilanes such as tetraethoxysilane, alkylalkoxysilanes such as methyltrimethoxysilane, methyltriethoxysilane, propyltrimethoxysilane, propyl-triethoxysilane, propylmethyldimethoxysilane, or propylmethyldiethoxysilane, n- or isohexyltrimethoxysilane, n- or isohexyl-triethoxysilane, n- or isohexylmethyldimethoxysilane, n- or isohexylmethyldiethoxysilane, or else the corresponding n- or isooctyl-, n-decyl-, n-dodecyl-, n-tetradecyl-, or n-hexadecylalkoxysilanes, phenylsilanes such as phenyltrimethoxysilane, phenyltriethoxysilane, phenylmethyldimethoxysilane, or phenylmethyldiethoxysilane, vinylsilanes such as vinyltrimethoxysilane, vinyltriethoxysilane, vinylmethyldimethoxysilane, or vinylmethyldiethoxysilane, carbamate-functional silanes such as O-methylcarbamatomethyl-methyldimethoxysilane, O-methylcarbamatomethyl-trimethoxysilane, O-ethylcarbamatomethyl-methyldiethoxysilane, O-ethylcarbamatomethyl-triethoxysilane, 3-(O-methylcarbamato)propyl-methyldimethoxysilane, 3-(O-methylcarbamato)propyl-trimethoxysilane, 3-(O-ethylcarbamato)propyl-methyldiethoxysilane, or 3-(O-ethylcarbamato)propyl-triethoxysilane, (meth-)acryloyl-functional silanes such as 3-methacryloyloxypropyl-trimethoxysilane, methacryloyl-oxymethyl-trimethoxysilane, methacryloyloxymethyl-methyldimethoxysilane, methacryloyloxymethyl-triethoxysilane, methacryloyloxymethyl-methyldiethoxysilane, 3-acryloyloxypropyl-trimethoxysilane, acryloyloxymethyl-trimethoxysilane, acryloyloxymethyl-methyldimethoxysilane, acryloyloxymethyl-triethoxysilane, or acryloyl-oxymethyl-methyldiethoxysilane, and also silanes with other functionalities, apart from radicals with basic nitrogen and epoxy radicals such as N-2-(3-triethoxysilylpropyl)maleic anhydride, N-(3-trimethoxysilylpropyl)urea, N-(3-triethoxysilyl-propyl)urea, N-(trimethoxysilylmethyl)urea, N-(methyl-dimethoxysilylmethyl)urea, N-(3-triethoxysilylmethyl)-urea, or N-(3-methyldiethoxysilylmethyl)urea, with preference being given to tetraethoxysilane and to vinylsilanes such as vinyltrimethoxysilane, vinyltriethoxysilane, vinylmethyldimethoxysilane, or vinylmethyldiethoxysilane, and particular preference to vinyltrimethoxysilane and vinyltriethoxysilane.

The optionally employed component (E) consists preferably to an extent of at least 90 wt % of units of the formula (IV). More preferably component (E) consists exclusively of units of the formula (IV).

Examples of radicals $R^7$ are the examples specified above for R. Radical $R^7$ preferably comprises monovalent, SiC-bonded aliphatic or aromatic hydrocarbon radicals which have 1 to 18 carbon atoms and which are optionally substituted by halogen atoms, and more preferably comprises the methyl or the phenyl radical.

Preferably in component (E) at least 30%, more preferably at least 50%, most preferably at least 60% of the units of the formula (IV) have a phenyl radical.

Examples of radical $R^8$ are hydrogen or the examples specified for radical R. Radical $R^8$ preferably comprises hydrogen or alkyl radicals which have 1 to 10 carbon atoms and which are substituted optionally by halogen atoms, and more preferably comprises the methyl and the ethyl radical.

Examples of component (E) are organopolysiloxane resins which consist substantially, preferably exclusively, of Q units of the formulae $SiO_{4/2}$, $Si(OR^8)O_{3/2}$, $Si(OR^8)_2O_{2/2}$, and $Si(OR^8)_3O_{1/2}$, T units of the formulae $PhSiO_{3/2}$, $PhSi(OR^8) O_{2/2}$, and $PhSi(OR^8)_2O_{1/2}$, D units of the formulae $Me_2SiO_{2/2}$ and $Me_2Si(OR^8)O_{1/2}$, and also M units of the formula $Me_3SiO_{1/2}$, where Me is a methyl radical, Ph is a phenyl radical, and $R^8$ has the definition indicated above, more particularly methyl radical, with the resin preferably containing 0 to 2 mol of Q units, 0 to 2 mol of D units, and 0 to 2 mol of M units per mole of T units.

Preferred examples of components (E) are organopolysiloxane resins which consist substantially, preferably exclusively, of T units of the formulae $PhSiO_{3/2}$, $PhSi(OR^8)O_{2/2}$, and $PhSi(OR^8)_2O_{1/2}$, optionally T units of the formulae $MeSiO_{3/2}$, $MeSi(OR^8)O_{2/2}$, and $MeSi(OR^8)_2O_{1/2}$, and also, optionally, D units of the formulae $Me_2SiO_{2/2}$ and $Me_2Si(OR^8)O_{1/2}$, where Me is a methyl radical, Ph is a phenyl radical, and $R^8$ has the definition indicated above, most preferably the methyl radical, with a molar ratio of phenylsilicone to methylsilicone units of preferably 0.5 to 5.0. The amount of D units in these silicone resins is preferably below 10 wt %.

The silicone resins (E) preferably possess a number-average molar mass $M_n$ of preferably 400 to 400,000 g/mol, more preferably of 600 to 100,000 g/mol, more particularly of 800 to 5000 g/mol. At 23° C. and 1000 hPa the silicone resins (E) may be either solid or liquid, with liquid silicone resins being preferred.

The optionally employed silicone resins (E) are commercial products, examples being various SILRES® products from Wacker Chemie AG, such as SILRES® IC 368, SIL-RES® IC 678, or SILRES® SY231, and/or may be prepared by methods commonplace within chemistry.

If the compositions (K) comprise silicone resins (E), the amounts involved are preferably 5 to 300 parts by weight, more particularly 10 to 200 parts by weight, based in each case on 100 parts by weight of component (A).

In one preferred embodiment, the compositions (K) comprise silicone resins (E).

In addition to components (A) to (E), the compositions (K) may comprise additional substances, different from components (A) to (E), examples being fillers (F), catalysts (G), additives (H), and adjuvants (I).

The fillers (F) optionally employed in the compositions (K) may be any desired known fillers. Examples of fillers (F) are nonreinforcing fillers, these being fillers having a BET surface area of preferably up to 50 $m^2/g$ such as quartz, diatomaceous earth, calcium silicate, zirconium silicate, talc, kaolin, zeolites, metal oxide powders such as aluminum oxides, titanium oxides, iron oxides, or zinc oxides, and/or their mixed oxides, barium sulfate, calcium carbonate, gypsum, silicon nitride, silicon carbide, boron nitride, glass powders, and polymeric powders such as polyacrylonitrile powders; reinforcing fillers, these being fillers having a BET surface area of more than 50 $m^2/g$ such as pyrogenically prepared silica, precipitated silica, precipitated chalk, carbon black such as furnace black and acetylene black, and mixed silicon aluminum oxides of high BET surface area; aluminum trihydroxide, fillers in hollow bead form such as ceramic microbeads, examples being those obtainable under the trade name Zeeospheres™ from 3M Deutschland GmbH of Neuss, Germany, elastic polymeric beads, of the kind obtainable, for instance, under the trade name EXPANCEL® from AKZO NOBEL, Expancel in Sundsvall, Sweden, or glass beads; fillers in fiber form such as asbestos and also polymeric fibers. The stated fillers may have been hydrophobicized by treatment, for example, with organosilanes and/or organosiloxanes or with stearic acid, or by etherification of hydroxyl groups to alkoxy groups.

The optionally employed fillers (F) preferably comprise calcium carbonate, talc, aluminum trihydroxide, and silica, with aluminum trihydroxide being especially preferred. Preferred calcium carbonate grades are ground or precipitated and have optionally been surface-treated with fatty acids such as stearic acid or salts thereof. The preferred silica preferably comprises fumed silica.

Optionally employed fillers (F) have a moisture content of preferably below 1 wt %, more preferably of below 0.5 wt %.

If the compositions (K) comprise fillers (F), the amounts involved are preferably 10 to 1000 parts by weight, more preferably 50 to 500 parts by weight, more particularly 80 to 300 parts by weight, based in each case on 100 parts by weight of constituent (A). The compositions (K) preferably comprise fillers (F).

In one or more embodiments, the compositions (K) comprise as fillers (F) a combination of
  a) silica, more particularly fumed silica, and
  b) calcium carbonate, aluminum trihydroxide, and/or talc.

If the compositions (K) do comprise this particular combination of different fillers (F), they comprise preferably 1 to 80 parts by weight, more preferably 5 to 40 parts by weight, of silica, more particularly fumed silica, and preferably 10 to 500 parts by weight, more preferably 50 to 300 parts by weight, of calcium carbonate, aluminum trihydroxide, talc, or mixtures of these materials, based in each case on 100 parts by weight of constituent (A).

The catalysts (G) employed optionally in the compositions (K) may be any desired catalysts known to date for compositions that cure by silane condensation, and that are different from component (B).

Examples of metal-containing curing catalysts (G) are organotitanium and organotin compounds, examples being titanic esters such as tetrabutyl titanate, tetrapropyl titanate, tetraisopropyl titanate, and titanium tetraacetylacetonate; tin compounds such as dibutyltin dilaurate, dibutyltin maleate, dibutyltin diacetate, dibutyltin dioctanoate, dibutyltin acetylacetonate, dibutyltin oxides, and corresponding dioctyltin compounds.

Examples of metal-free curing catalysts (G) are basic compounds such as triethylamine, tributylamine, 1,4-diazabicyclo[2.2.2]octane, 1,5-diazabicyclo[4.3.0]non-5-ene, 1,8-diazabicyclo[5.4.0]undec-7-ene, N,N-bis(N,N-dimethyl-2-aminoethyl)methylamine, guanidine, N-alkylated guanidines such as dimethylguanidine, trimethylguanidine, tetramethylguanidine, or pentamethylguanidine, N,N-dimethylcyclohexylamine, N,N-dimethylphenylamine, and N-ethylmorpholinine.

It is also possible to employ acidic compounds as catalyst (G), the acidic compounds being, for example, phosphoric acid and its esters, toluenesulfonic acid, sulfuric acid, nitric acid, or else organic carboxylic acids, e.g., acetic acid and benzoic acid.

If the compositions (K) comprise catalysts (G), the amounts involved are preferably 0.01 to 20 parts by weight, more preferably 0.05 to 5 parts by weight, based in each case on 100 parts by weight of constituent (A).

In one embodiment, the optionally employed catalysts (G) comprise metal-containing curing catalysts, preferably tin-containing catalysts. This embodiment of the invention is preferred especially when component (A) consists entirely or at least partly, i.e., to an extent of at least 90 wt %, preferably at least 95 wt %, of compounds of the formula (I) in which b is other than 1.

Preferably, the compositions (K) are free of tin-containing catalysts (G), more preferably metal-containing catalysts (G), and most preferably all catalysts (G), when component (A) consists entirely or at least partly, in other words to an extent of at least 10 wt %, preferably at least 20 wt %, of compounds of the formula (I) in which b is 1 and $R^1$ has the definition of hydrogen. This embodiment of the invention, without metal-containing and more particularly without tin-containing catalysts, is particularly preferred.

The additives (H) employed optionally in the compositions (K) may be any desired known additives that are typical of silane-crosslinking systems. The optionally employed additives (H) are preferably antioxidants, UV stabilizers such as HALS compounds, for example, fungicides, and pigments.

If the compositions (K) comprise additives (H), the amounts involved are preferably 0.01 to 30 parts by weight, more preferably 0.1 to 10 parts by weight, based in each case on 100 parts by weight of constituent (A). The compositions (K) preferably do comprise additives (H).

The optionally employed adjuvants (I) preferably comprise plasticizers, rheological additives, flame retardants, and organic solvents.

Examples of plasticizers (I) are such as phthalic esters (e.g., dioctyl phthalate, diisooctyl phthalate, and diundecyl phthalate), perhydrogenated phthalic esters (e.g., diisononyl 1,2-cyclohexanedicarboxylate and dioctyl 1,2-cyclohexanedicarboxylate), adipic esters (e.g., dioctyl adipate), benzoic esters, glycol esters, esters of saturated alkanediols (e.g., 2,2,4-trimethyl-1,3-pentanediol monoisobutyrates and 2,2,4-trimethyl-1,3-pentanediol diisobutyrates), phosphoric esters, sulfonic esters, polyesters, polyethers (e.g., polyethylene glycols and polypropylene glycols having molar masses of preferably 1000 to 10,000 daltons), polystyrenes, polybutadienes, polyisobutylenes, paraffinic hydrocarbons, and branched hydrocarbons of high molecular mass.

The rheological additives (I) are preferably polyamide waxes, hydrogenated castor oils, or urea derivatives based on MDI.

Examples of organic solvents (I) are such as ethers (e.g., diethyl ether, methyl tert-butyl ether, ether derivatives of glycol, THF), esters (e.g., ethyl acetate, butyl acetate, glycol esters), hydrocarbons (e.g., pentane, cyclopentane, hexane, cyclohexane, heptane, octane, or else longer-chain branched and unbranched alkanes), ketones (e.g., acetone, methyl ethyl ketone), aromatics (e.g., toluene, xylene, ethylbenzene, chlorobenzene), or else alcohols (e.g., methanol, ethanol, glycol, propanol, isopropanol, glycerol, butanol, isobutanol, tert-butanol), with alcohols being preferred.

With preference, no organic solvents (I) are added to the compositions (K). If the compositions (K) comprise one or more components (I), the amounts involved in each case are preferably 0.5 to 200 parts by weight, more preferably 1 to 100 parts by weight, more particularly 2 to 70 parts by weight, based in each case on 100 parts by weight of component (A).

The compositions (K) are preferably compositions comprising:

(A) 100 parts by weight of silane-terminated polyoxyalkylenes having end groups of the formula (VI) and an average molar mass $M_n$ of 10,000 to 30,000 g/mol, (B) 0.2 to 20 parts by weight of silanes of the formula (II) and/or their partial hydrolyzates, (C) 0.2 to 20 parts by weight of silanes of the formula (III) and/or their partial hydrolyzates, with the proviso that at least 15%, preferably at least 25%, more preferably at least 35%, particularly at least 45%, of all of the Si atoms in components (B) and (C) belong to units of the formulae (II) or (III), where e or h is 1, and also at least one further component selected from (D) 0.2 to 20 parts by weight of alkoxysilanes and (E) 1 to 500 parts by weight of silicone resins, and also, additionally, optionally (F) fillers, optionally (G) catalysts, optionally (H) additives, and optionally (I) adjuvants.

The compositions (K) are preferably compositions comprising:

(A) 100 parts by weight of linear silane-terminated polyoxypropylenes at least 85% of whose chain ends are terminated by end groups of the formula (VI), and which have an average molar mass $M_n$ of 10,000 to 30,000 g/mol, (B) 0.2 to 20 parts by weight of silanes of the formula (II) and/or their partial hydrolyzates, (C) 0.2 to 20 parts by weight of silanes of the formula (III) and/or their partial hydrolyzates, with the proviso that at least 15%, preferably at least 25%, more preferably at least 35%, particularly at least 45%, of all of the Si atoms in components (B) and (C) belong to units of the formulae (II) or (III), where e or h is 1, and also at least one further component selected from (D) 0.2 to 20 parts by weight of alkoxysilanes, and (E) 1 to 500 parts by weight of silicone resins, and also, additionally, optionally (F) fillers, optionally (G) catalysts, optionally (H) additives, and optionally (I) adjuvants.

The compositions (K) more preferably are compositions comprising:

(A) 100 parts by weight of linear silane-terminated polyoxypropylenes at least 85% of whose chain ends are terminated by end groups of the formula (VI), and which have an average molar mass $M_n$ of 11,000 to 22,000 g/mol, (B) 0.5 to 15 parts by weight of silanes of the formula (II) and/or their partial hydrolyzates, (C) 0.5 to 10 parts by weight of silanes of the formula (III) and/or their partial hydrolyzates, with the proviso that at least 15%, preferably at least 25%, more preferably at least 35%, particularly at least 45%, of all of the Si atoms in components (B) and (C) belong to units of the formulae (II) or (III), where e or h is 1, and also at least one further component selected from (D) 0.5 to 10 parts by weight of alkoxysilanes, and (E) 5 to 200 parts by weight of silicone resins, and also, additionally, optionally (F) fillers, optionally (G) catalysts, optionally (H) antioxidants, UV stabilizers, fungicides, biocides, or pigments, and optionally (I) plasticizers, rheological additives, flame retardants, or organic solvents.

The compositions (K) are more particularly compositions comprising:

(A) 100 parts by weight of linear silane-terminated polyoxypropylenes at least 85% of whose chain ends are terminated by end groups of the formula (VI), and which have an average molar mass $M_n$ of 11,000 to 22,000 g/mol, (B) 0.5 to 15 parts by weight of silanes of the formula (II), where e=1 and/or their partial hydrolyzates, (C) 0.5 to 10 parts by weight of silanes of the formula (III), where h=0 and/or their partial hydrolyzates, and also at least one further component selected from (D) 0.5 to 10 parts by weight of alkoxysilanes selected from the group consisting of tetraethoxysilane, vinyltrimethoxysilane, vinyltriethoxysilane, vinylmethyldimethoxysilane, or vinylmethyldiethoxysilane, and (E) 5 to 200 parts by weight of silicone resins comprising phenyl groups,
and also, additionally,
optionally
(F) fillers,
optionally
(G) catalysts,
optionally
(H) antioxidants, UV stabilizers, fungicides, biocides, or pigments, and
optionally
(I) plasticizers, rheological additives, flame retardants, or organic solvents.

The compositions (K) preferably comprise no constituents other than components (A) to (I). The components may in each case comprise one kind of such a component or else a mixture of at least two kinds of a respective component.

The compositions (K) are preferably formulations having viscosities of preferably 500 to 1,000,000 mPas, more preferably of 1000 to 500,000 mPas, more particularly 1000 to 20,000 mPas, in each case at 25° C.

In one preferred embodiment, the compositions are distinguished by having, after their complete curing, a tensile strength of at least 1 MPa, measured in each case in accordance with DIN EN 53504.

In another preferred embodiment, the compositions are distinguished by having, after their complete curing, a tensile shear strength of at least 5 MPa, more preferably of at least 8 MPa, most preferably at least 10 MPa, in each case measured in accordance with DIN EN 204.

The present invention further provides a process for producing the crosslinkable compositions by mixing of the individual components in any order. The mixing may take place at room temperature and at atmospheric pressure, in other words at about 900 to 1100 hPa. If desired; however, the mixing may also take place at higher temperatures, as for example at temperatures in the range from 30 to 130° C. It is possible, furthermore, to carry out mixing occasionally or continually under reduced pressure such as at an absolute pressure of 30 to 500 hPa, for example, to remove volatile compounds and/or air. The mixing takes place preferably in the absence of moisture. The process of preparing the invention may be carried out continuously or discontinuously.

The compositions (K) are preferably one-component compositions which are storable in the absence of water and which are crosslinkable at room temperature on ingress of water. Alternatively, the compositions (K) may be part of two-component crosslinking systems, where OH-containing compounds such as water, are added in a second component.

The customary water content of the air is sufficient for the crosslinking of the compositions (K). The crosslinking of the compositions (K) takes place preferably at room temperature. It may also be carried out, if desired, at temperatures higher or lower than room temperature, as for example at −5° to 15° C. or at 30° to 50° C., and/or by means of water concentrations exceeding the normal water content of the air. The crosslinking is carried out preferably under a pressure of 100 to 1100 hPa, more preferably under atmospheric pressure, in other words at about 900 to 1100 hPa.

The invention further provides shaped articles produced by crosslinking of the compositions. The shaped articles may be any desired shaped articles such as seals, compressed articles, extruded profiles, coatings, impregnation systems, encapsulation, lenses, prisms, polygonal structures, laminate layers, or adhesive layers.

Further provided by the invention is a method for adhesively bonding or sealing substrates, in which the composition is applied to the surface of at least one substrate, this surface is then brought into contact with the second substrate to be bonded, and then crosslinking is caused to take place.

Examples of substrates which can be adhesively bonded or sealed are, in particular, wood, but also plastics including PVC, concrete, mineral substrates, metals, glass, ceramic, and painted surfaces. Materials both alike and different may be bonded to one another.

The invention further provides a method for producing coatings or encapsulations, in which the composition is applied to at least one substrate and then is caused to crosslink. Examples are encapsulating compositions for LEDs or other electronic components, the production of molded articles, composite materials, and composite moldings. The composite moldings mean a uniform molded article made from a composite material, which is composed of a crosslinking product of the compositions (K) and of at least one substrate such that between the two parts there is a firm, durable bond.

The compositions (K) have the advantage that they exhibit a good adhesion profile even under the conditions of water storage. The compositions (K) have the advantage that they are easy to produce. Further, the crosslinkable compositions (K) have the advantage that they are distinguished by a very high storage stability and a high crosslinking rate. The crosslinkable compositions (K) have the advantage, moreover, that they are easy to work with. The crosslinkable compositions (K) have the advantage, moreover, that they can be used to obtain adhesives with high tensile strength. Furthermore, the moisture-curing adhesives and sealants have the advantage that they exhibit a significantly improved adhesion profile after cold-water storage.

In the examples described below, all viscosity figures are based on a temperature of 25° C. Unless otherwise specified, the examples below are carried out under atmospheric pressure, in other words approximately at 1000 hPa, and at room temperature, in other words at approximately 23° C., or at a temperature which comes about when the reactants are combined at room temperature without additional heating or cooling, and also at a relative atmospheric humidity of approximately 50%. All statements of parts and percentages, moreover, are based—unless otherwise indicated—on the weight.

Inventive Example 1

Production of an Adhesive Formulation 98.8 g of silane-terminated polypropylene glycol having an average molar mass $M_n$ of 12,000 g/mol and end groups of the formula —O—C(=O)—NH—CH$_2$—SiCH$_3$(OCH$_3$)$_2$ (available commercially under the name GENIOSIL® STP-E10 from Wacker Chemie AG, Munich, DE) are homogenized for 2 minutes at 200 rpm in a laboratory planetary mixer from PC-Laborsystem, equipped with two cross-arm mixers, at about 25° C. with 98 g of a polypropylene glycol having an average molar mass Mn of 2000 g/mol, 2.0 g of HALS stabilizer (available commercially under the name TINUVIN® 123 from BASF AG, Ludwigshafen, DE; CAS No.: 129757-67-1), and 6 g of vinyltrimethoxysilane. Mixed in thereafter for one minute with stirring at 600 rpm are 171.2 g of finely ground marble coated with stearic acid and having an average particle diameter (D50%) of about 2.0 μm (available commercially under the name Omyabond 520 from Omya, Cologne, DE) and 16 g of a hydrophobic fumed silica having a BET surface area of about 200 m$^2$/g (available commercially under the name HDK® H18 from Wacker Chemie AG, Munich, DE). Lastly, 4 g of N-(2-aminoethyl)-3-aminopropyl-methyldimethoxysilane and 4 g of 3-glycidyloxypropyl-trimethoxysilane are mixed for 1 minute at 200 rpm and the mixture is homogenized for 1 minute at 200 rpm under partial vacuum (about 100 mbar) and stirred until free of bubbles. The resulting composition is dispensed into 310 ml PE cartridges and stored at 20° C. for 24 hours prior to testing.

Inventive Example 2

Production of an Adhesive Formulation

A procedure of example 1 is followed. However, instead of 4 g of 3-glycidyloxypropyl-trimethoxysilane and 4 g of N-(2-aminoethyl)-3-aminopropyl-methyldimethoxysilane, 4 g each of 3-glycidyloxypropyl-methyldiethoxysilane and of N-(2-aminoethyl)-3-aminopropyl-trimethoxysilane are used. The resulting composition is dispensed into 310 ml PE cartridges and stored at 20° C. for 24 hours prior to testing.

Inventive Example 3

Production of an Adhesive Formulation

A procedure of example 1 is followed. However, instead of 4 g of 3-glycidyloxypropyl-trimethoxysilane, 4 g of 3-glycidyloxypropyl-methyldiethoxysilane are used. The resulting composition is dispensed into 310 ml PE cartridges and stored at 20° C. for 24 hours prior to testing.

Comparative Example 1

C1

Production of an Adhesive Formulation

A procedure of example 1 is followed. However, instead of 4 g of N-(2-aminoethyl)-3-aminopropyl-methyldimethoxysilane, 4 g of N-(2-aminoethyl)-3-aminopropyl-trimethoxysilane are used. The resulting composition is dispensed into 310 ml PE cartridges and stored at 20° C. for 24 hours prior to testing.

Comparative Example 2

C2

Production of an Adhesive Formulation

A procedure of example 1 is followed. However, instead of 4 g of 3-glycidyloxypropyl-trimethoxysilane and 4 g of N-(2-aminoethyl)-3-aminopropyl-methyldimethoxysilane, 8 g of N-(2-aminoethyl)-3-aminopropyl-methyldimethoxysilane are used. The resulting composition is dispensed into 310 ml PE cartridges and stored at 20° C. for 24 hours prior to testing.

Comparative Example 3

C3

Production of an Adhesive Formulation

A procedure of example 1 is followed. However, instead of 4 g of 3-glycidyloxypropyl-trimethoxysilane and 4 g of N-(2-aminoethyl)-3-aminopropyl-methyldimethoxysilane, 8 g of N-(2-aminoethyl)-3-aminopropyl-trimethoxysilane are used. The resulting composition is dispensed into 310 ml PE cartridges and stored at 20° C. for 24 hours prior to testing.

Example 4

The compositions obtained in inventive examples 1 to 3 and in comparative examples C1 to C3 were allowed to crosslink and were tested for their skin-forming, mechanical properties, and adhesion profile after water storage. The results can be found in table 1.

Skin-Forming Time (SFT)

For the determination of the skin-forming time, the crosslinkable compositions obtained in the examples are applied as a layer 2 mm thick to PE film and are stored under standard conditions (23° C. and 50% relative atmospheric humidity). In the course of curing, the formation of a skin is tested every 5 minutes. This is done by carefully placing a dry laboratory spatula on the surface of the sample and pulling it upward. If sample sticks to the spatula, a skin has not yet formed. When sample no longer sticks to the spatula, a skin has formed and the time is recorded.

Mechanical Properties

The compositions were each coated out to a depth of 2 mm on milled-out Teflon plates and were cured for 2 weeks at 23° C. and 50% relative humidity.

Shore A hardness is determined according to DIN 53505. Tensile strength is determined according to DIN 53504-S1. Elongation at break is determined according to DIN 53504-S1.

Adhesion Profile

Adhesion tests were carried out with each of the compositions, on the substrates indicated in table 1, under the following conditions:

A bead 5-7 cm thick is applied to the substrate and stored for 14 days in a conditioning cabinet at room temperature with a relative atmospheric humidity of 50%. The sample is then stored for additional 14 days at room temperature under water.

Following storage, a peel test is carried out, in which the bead is cut off at one end over a length of about 2 cm from the substrate, using a sharp blade.

Subsequently, starting from this cut, the remainder of the bead is torn off from the substrate, and the nature of the resulting tear (cohesive and/or adhesive) is assessed.

TABLE 1

| | Composition from example | | | | | |
|---|---|---|---|---|---|---|
| | 1 | 2 | 3 | C1 | C2 | C3 |
| SFT [min] | 43 | 35 | 44 | 35 | 32 | 31 |
| Shore A hardness | 41 | 39 | 41 | 41 | 32 | 37 |
| Tensile strength [N/mm$^2$] | 1.4 | 1.4 | 1.4 | 1.3 | 1.7 | 1.6 |
| Elongation at break [%] | 201 | 244 | 222 | 182 | 591 | 341 |
| Adhesion: | | | | | | |
| AlMGSi1 | + | + | + | + | − | + |
| AlMg anodized | + | + | + | − | − | ∅ |
| Stainless steel | + | + | + | + | − | − |
| Steel DC05 with cathodic electrocoat | + | + | + | + | − | − |
| Glass | + | + | + | − | − | − |
| Wood | + | + | + | + | + | + |
| PVC | ∅ | − | + | − | + | − |
| Polycarbonate | ∅ | + | + | ∅ | − | − |
| Ceramic tile | + | + | + | − | − | − |

(+) good adhesion/cohesive tearing in peel test
(∅) partial adhesion/cohesive and adhesive tearing in peel test
(−) no adhesion/adhesive tearing in peel test

Inventive Example 5

Production of an Adhesive Formulation 133 g of silane-terminated polypropylene glycol having an average molar mass $M_n$ of 12,000 g/mol and end groups of the formula —O—C(=O)—NH—CH$_2$—SiCH$_3$(OCH$_3$)$_2$ (available commercially under the name GENIOSIL® STP-E10 from Wacker Chemie AG, Munich, DE) are homogenized for 2 minutes at 200 rpm in a laboratory planetary mixer from PC-Laborsystem, equipped with two cross-arm stirrers, at about 25° C. with 247 g of a solvent-free, liquid phenylsilicone resin, which is composed of phenyl-functional T units (60-80 wt %) and methyl-functional T units (18-30 wt %) and dimethyl-functional D units (2-5 wt %) and has a methoxy groups content of 12-16 wt % and an average molar mass $M_n$ of 800-1300 g/mol (available commercially under the name SILRES® IC 368 from Wacker Chemie AG, Munich, DE), and 10.0 g of 3-glycidyloxypropyl-trimethoxysilane. Thereafter 10.0 g of N-(2-aminoethyl)-3-aminopropyl-methyldimethoxysilane are mixed in for 1 minute at 200 rpm. Lastly, homogenization takes place for 2 minutes at 600 rpm and for 1 minute at 200 rpm under pressure of 100 mbar, with stirring until the mixture is free of bubbles. The formulation is dispensed into 310 ml PE cartridges and stored at 20° C. for one day prior to testing.

Inventive Example 6

Production of an Adhesive Formulation

A procedure of example 5 is followed. However, only 129 g of silane-terminated polymer (GENIOSIL® STP-E10) and 241 g of phenylsilicone resin (SILRES® IC 368) are used. Instead, an additional 10 g of a hydroxyl-terminated, liquid poly-[N-(2-aminoethyl)-3-aminopropyl]methylsiloxane are incorporated, having a viscosity of 2000-6000 mPas at 25° C. (available commercially under the name GENIOSIL® GF95-Hydrolyzat from Wacker Chemie AG, Munich, DE). The resulting composition is dispensed into 310 ml PE cartridges and stored at 20° C. for 24 hours prior to testing.

Comparative Example C4

Production of an Adhesive Formulation

A procedure of example 5 is followed. However, instead of 10 g of N-(2-aminoethyl)-3-aminopropyl-methyldimethoxysilane, 10 g of N-(2-aminoethyl)-3-aminopropyl-trimethoxysilane are used. The resulting composition is dispensed into 310 ml PE cartridges and stored at 20° C. for 24 hours prior to testing.

Comparative Example C5

Production of an Adhesive Formulation

A procedure of example 5 is followed. However, instead of 10 g of 3-glycidyloxypropyl-trimethoxysilane and 10 g of N-(2-aminoethyl)-3-aminopropyl-methyldimethoxysilane, 20 g of N-(2-aminoethyl)-3-aminopropyl-trimethoxysilane are used. The resulting composition is dispensed into 310 ml PE cartridges and stored at 20° C. for 24 hours prior to testing.

Example 7

The compositions obtained in inventive examples 5 and 6 and in comparative examples C4 and C5 were allowed to crosslink and were investigated for their skin-forming, and tensile shear strength with and without water storage. The skin-forming time was determined as described in example 4. The results are found in table 2.

Tensile Shear Strength

The tensile shear strengths are determined as described in DIN EN 204. The adhesive is applied to both beech blocks to be bonded, followed by drawdown with a 100 µm doctor blade. The two wooden blocks are then joined over an area of 1 times 2 cm, with applied pressure of 5 kg. After 24 hours of pressure application, the blocks are stored under standard conditions for the period of time indicated. In the case of the determination of the D4-1 figure, the tensile shear strength of the two bonded blocks is measured directly after 7 days of storage under standard conditions.

In the case of the determination of the D4-3 figure, the tensile shear strength of the two bonded blocks is measured after 7 days of storage under standard conditions, followed by 4 days of storage in water with a temperature of 23° C., and then 2 hours of equilibration under standard conditions.

In the case of the determination of the D4-5 figure, the tensile shear strength of the two bonded blocks is measured after 7 days of storage under standard conditions, followed by 6 hours of storage in boiling water, and then 2 hours of equilibration under standard conditions.

The figures achieved are those reported in table 2:

TABLE 2

| | Composition from example | | | |
|---|---|---|---|---|
| | 5 | 6 | C4 | C5 |
| SFT [min] | 69 | 64 | 58 | 66 |
| Storage conditions | Tensile shear strength [MPa] | | | |
| D4-1 (standard conditions) | 10.4 | 13.5 | 11.2 | 10.2 |
| D4-3 (cold water test) | 3.3 | 4.1 | 1.9 | 2.5 |
| D4-5 (boiling water test) | 3.4 | 4.5 | 3.1 | 3.0 |

The invention claimed is:
1. A crosslinkable composition comprising:
(A) 100 parts by weight of compound(s) of the formula:

$$Y-[(CR^1{}_2)_b-SiR_a(OR^2)_{3-a}]_x \quad (I),$$

wherein

Y is an x-valent polymer radical bonded via nitrogen, oxygen, sulfur, or carbon, R each are identical or different monovalent, optionally substituted, SiC-bonded hydrocarbon radicals, R$^1$ each are identical or different, and are a hydrogen or a monovalent, optionally substituted hydrocarbon radical optionally bonded to the carbon atom via nitrogen, phosphorus, oxygen, sulfur, or a carbonyl group, R$^2$ each are identical or different, and are a hydrogen or a monovalent, optionally substituted hydrocarbon radical, x is an integer from 1 to 10, a is identical or different and is 0, 1, or 2, and b is identical or different and is an integer from 1 to 10;

(B) 0.1 to 30 parts by weight of organosilicon compound(s) comprising units of the formula:

$$DSi(OR^3)_d R^4{}_e O_{(3-d-e)/2} \quad (II)$$

wherein

D is a monovalent, SiC-bonded radical containing basic nitrogen, $R^3$ each are identical or different, and are a hydrogen or an optionally substituted hydrocarbon radical, $R^4$ each are identical or different unsubstituted or halogen-substituted, SiC-bonded alkyl radicals having 1 to 8 carbon atoms, d is 0, 1, 2, or 3, and e is 0, 1, 2, or 3, wherein the sum total of d+e≤3 and at least one radical (OR$^3$) is present per molecule;

(C) 0.1 to 30 parts by weight of organosilicon compound(s) comprising units of the formula:

$$ESi(OR^5)_g R^6_h O_{(3-g-h)/2} \qquad (III),$$

wherein

E each are identical or different monovalent, SiC-bonded radicals having an epoxy function, $R^5$ each are identical or different, and are a hydrogen or an optionally substituted hydrocarbon radical, $R^6$ each are identical or different unsubstituted or halogen-substituted, SiC-bonded alkyl radicals having 1 to 8 carbon atoms, g is 0, 1, 2, or 3, and h is 0, 1, 2, or 3, wherein the sum total of g+h≤3 and at least one radical (OR$^5$) is present per molecule, with the proviso that at least 15% of all of the Si atoms in the components (B) and (C) belong to units of the formulae (II) or (III), wherein e or h is 1;

and at least one component selected from the components:

(D) 0.1 to 30 parts by weight of alkoxysilane(s) different from the components (B) and (C), and (E) 1 to 500 parts by weight of silicone resin(s) different from the components (B) and (C), comprising units of the formula:

$$R^7_i (R^8 O)_j SiO_{(4-i-j)/2} \qquad (IV),$$

wherein $R^7$ each are identical or different, and are a hydrogen or a monovalent, SiC-bonded, optionally substituted hydrocarbon radical, $R^8$ each are identical or different, and are a hydrogen or a monovalent, optionally substituted hydrocarbon radical, i is 0, 1, 2, or 3, and j is 0, 1, 2, or 3, with the proviso that the sum total of i+j≤3 and in at least 50% of the units of the formula (IV) i is 0 or 1.

2. The composition of claim 1, wherein the component (B) comprises silane(s) of the formula (II) and/or their partial hydrolyzate(s).

3. The composition of claim 1, wherein the component (C) comprises silane(s) of the formula (III) and/or their partial hydrolyzate(s).

4. The composition of claim 1, wherein the component (A) comprises silane-terminated polyoxyalkylene(s).

5. The composition of claim 1 comprising:
(A) 100 parts by weight of silane-terminated polyoxyalkylene(s) having end groups of the formula (VI) and an average molar mass $M_n$ of 10,000 to 30,000 g/mol;
(B) 0.2 to 20 parts by weight of silane(s) of the formula (II) and/or their partial hydrolyzate(s);
(C) 0.2 to 20 parts by weight of silane(s) of the formula (III) and/or their partial hydrolyzate(s);
with the proviso that at least 15% of all the Si atoms in the components (B) and (C) belong to units of the formulae (II) or (III), wherein e or h is 1; and at least one component selected from (D) and/or (E):
(D) 0.2 to 20 parts by weight of alkoxysilane(s) and
(E) 1 to 500 parts by weight of silicone resin(s);
(F) optionally filler(s);
(G) optionally catalyst(s);
(H) optionally additive(s); and
(I) optionally adjuvant(s).

6. The composition of claim 1 comprising:
(A) 100 parts by weight of linear silane-terminated polyoxypropylene(s) having at least 85% chain ends terminated by end groups of the formula (VI) and having an average molar mass $M_n$ of 11,000 to 22,000 g/mol;
(B) 0.5 to 15 parts by weight of silane(s) of the formula (II), wherein e=1 and/or their partial hydrolyzate(s);
(C) 0.5 to 10 parts by weight of silane(s) of the formula (III), wherein h=0 and/or their partial hydrolyzate(s); and at least one component selected from (D) and/or (E):
(D) 0.5 to 10 parts by weight of alkoxysilane(s) selected from the group consisting of tetraethoxysilane, vinyltrimethoxysilane, vinyltriethoxysilane, vinylmethyldimethoxysilane, vinylmethyldiethoxysilane, and mixtures thereof,
(E) 5 to 200 parts by weight of silicone resin(s) comprising phenyl groups;
(F) optionally filler(s);
(G) optionally catalyst(s);
(H) optionally antioxidant(s), UV stabilizer(s), fungicide(s), biocide(s), or pigment(s); and
(I) optionally plasticizer(s), rheological additive(s), flame retardant(s), or organic solvent(s).

7. A method for producing a crosslinkable composition of claim 1 by mixing individual components in any order.

8. A molding produced by crosslinking a composition of claim 1.

9. A molding produced by crosslinking a composition produced in claim 7.

10. A method for adhesively bonding or sealing substrates comprising:
applying a crosslinkable composition of claim 1 to a surface of at least one substrate to form an adhesive-coated surface,
contacting the adhesive-coated surface with a second substrate to be bonded, and
crosslinking the crosslinkable composition.

11. A method for adhesively bonding or sealing substrates comprising:
applying a crosslinkable composition produced in claim 7 to a surface of at least one substrate to form an adhesive-coated surface,
contacting the adhesive-coated surface with a second substrate to be bonded, and
crosslinking the crosslinkable composition.

12. A method for producing coatings or castings comprising:
applying a crosslinkable composition of claim 1 to at least one substrate and crosslinking the crosslinkable composition.

13. A method for producing coatings or castings comprising:
applying a crosslinkable composition produced in claim 7 to at least one substrate and crosslinking the crosslinkable composition.

* * * * *